US007428509B2

(12) United States Patent
Klebanoff

(10) Patent No.: US 7,428,509 B2
(45) Date of Patent: Sep. 23, 2008

(54) METHOD AND SYSTEM FOR DETECTING PAYMENT ACCOUNT FRAUD

(75) Inventor: Victor Franklin Klebanoff, Waccabuc, NY (US)

(73) Assignee: MasterCard International Incorporated, Purchase, NY (US)

( * ) Notice: Subject to any disclaimer, the term of this patent is extended or adjusted under 35 U.S.C. 154(b) by 1207 days.

(21) Appl. No.: 10/339,848

(22) Filed: Jan. 10, 2003

(65) Prior Publication Data

US 2004/0039686 A1 Feb. 26, 2004

Related U.S. Application Data

(60) Provisional application No. 60/348,071, filed on Jan. 10, 2002.

(51) Int. Cl.
*G06Q 40/00* (2006.01)

(52) U.S. Cl. .............................. 705/38; 705/35; 705/39

(58) Field of Classification Search .............. 705/38–40
See application file for complete search history.

(56) References Cited

U.S. PATENT DOCUMENTS

| 5,819,226 | A | 10/1998 | Gopinathan et al. ............ 705/1 |
| 5,884,289 | A | 3/1999 | Anderson et al. ............. 705/44 |
| 6,094,643 | A | 7/2000 | Anderson et al. ............. 705/44 |
| 6,330,546 | B1 * | 12/2001 | Gopinathan et al. ........... 705/35 |
| 6,839,682 | B1 * | 1/2005 | Blume et al. ................. 705/10 |

OTHER PUBLICATIONS

"Card Fraud: Down But Not Out", Linda Punch, Credit Card Management, Jun. 1999, pp. 30-33 and 36-38.*
Avoiding Bust-Out Fraud, Collections & Credit Risk, May 1997, p. 1.*
Terry Philip Segal, Lawrence S Feld, Bankruptcy fraud: A new Department of Justice prosecution priority, Commercial Law Bulletin, Chicago: May/Jun. 1998. vol. 13, Iss. 3; pp. 16-18.*
Norman E Cowie, Warning bells and "the bust-out", Business Credit, New York: Jul./Aug. 2000. vol. 102, Iss. 7; pp. 15-17.*

* cited by examiner

*Primary Examiner*—Lalita M. Hamilton
*Assistant Examiner*—Gregory L. Johnson
(74) *Attorney, Agent, or Firm*—Baker Botts L.L.P.

(57) ABSTRACT

A method and system for identifying patterns of payment account (e.g., credit card account) transactions that have a high probability of being part of a fraudulent scheme. Certain merchant accounts and payment accounts may have been obtained under false pretenses. For example, the payment accounts may have been obtained with the intention of never paying the bills with a true instrument. Merchant accounts may have been obtained in order to perform transactions either with payment accounts obtained under false pretenses or with stolen payment account information. To detect suspicious patterns of account activity, payment accounts that are new or exhibit a substantial increase in account activity are first identified. Merchant accounts having an unusually large number or value of transactions with such new or newly active payment accounts are also identified. Such merchants and payment accounts can then be subjected to further scrutiny by the affected institutions.

27 Claims, 9 Drawing Sheets

METHOD AND SYSTEM FOR DETECTING PAYMENT ACCOUNT FRAUD

CROSS-REFERENCE TO RELATED APPLICATIONS

This application claims priority to U.S. Provisional Patent Application Ser. No. 60/348, 071, entitled "Method and System for Detecting Fraudulent Payment Card Transactions," filed on Jan. 10, 2002, which is incorporated herein by reference in its entirety.

REFERENCE TO COMPUTER PROGRAM LISTING APPENDIX

A computer program listing appendix is submitted with this application on two identical compact discs, one being the primary compact disc and the other being a duplicate thereof. All of the material on the discs is incorporated herein by reference. Each compact disc contains the following files:

| Title | Size | Date Created |
|---|---|---|
| step106.doc | 33 KB | Jan. 8, 2003 |
| step108.doc | 63 KB | Jan. 8, 2003 |
| step206.doc | 32 KB | Jan. 8, 2003 |
| step702.doc | 23 KB | Jan. 8, 2003 |
| step704.doc | 22 KB | Jan. 8, 2003 |
| steps602_610.doc | 23 KB | Jan. 8, 2003 |
| steps706_714.doc | 31 KB | Jan. 8, 2003 |

BACKGROUND OF THE INVENTION

Payment accounts such as credit card and debit card accounts are sometimes used by criminals to perpetrate fraud. In one type of payment account fraud, commonly referred to as a "bust-out" scheme, a perpetrator obtains one or more payment card and/or merchant accounts with an intent to defraud. Such schemes typically occur in two variants: the "cardholder bust-out" and the "merchant bust-out"—although both variants may be present in a single criminal enterprise.

In a cardholder bust-out, one or more payment card accounts are obtained using fraudulent applications; the intent is to pay future bills with bad checks. The scheme begins when an individual obtains a portfolio of payment accounts. Typically the cardholder nurtures the accounts by conducting transactions and making genuine payments during a "warm-up" period, thus establishing a seemingly legitimate usage and payment profile. Then, after the warm-up period, the cardholder conducts further transactions, but pays the resulting credit card bill(s) with bad checks. The checks may be business checks or credit card balance transfer checks, and may be used in a round-robin kiting pattern. Financial institutions often increase an account's open-to-buy amount upon receipt of a check, without waiting for the check to clear. The cardholder can therefore conduct a second round of shopping transactions before the check is returned to the card issuer for insufficient funds. The shopping often involves purchases of valuable merchandise or services at legitimate merchants. These goods and services may include electronics, jewelry, furniture, airline tickets, auto repairs, and/or cash advances at banks or gaming establishments. Alternatively, or in addition, the perpetrator can conduct phony transactions in which no goods or services are provided. Such phony transactions can be conducted either with collusive real merchants—typically in exchange for a share of the transaction value—or with sham merchants. When phony transactions are performed, the acquiring bank's deposits to the merchant's account serve as the proceeds of the scheme.

In a merchant bust-out, the perpetrator obtains one or more merchant accounts and uses the accounts to perform transactions based on stolen account data or on card accounts obtained with fraudulent applications. The scheme begins either with the establishment of one or more sham merchant accounts or with a decision by a legitimate merchant to perform phony transactions in collusion with cardholders. The merchant and cardholder may, in fact, be the same human person. In some cases, merchant accounts are established solely for the purpose of conducting transactions on compromised payment accounts. For example, the merchant may conduct transactions using stolen cards or, more typically, stolen account data. Stolen account data are typically acquired by skimming (covertly copying a card's magnetic stripe data) or by hacking into an Internet merchant's website.

Cardholder bust-out schemes are often not identified as fraud by payment card issuers because in many cases the losses are handled by a financial institution's collections department. A bust-out merchant may not be identified as fraudulent by its acquiring bank unless and until chargebacks are posted. Chargebacks are not posted unless and until the payment card issuer determines that accounts were used fraudulently. Furthermore, even if individual schemes are detected, each victimized financial institution may never recognize that the individual schemes are part of a larger web of organized activity

SUMMARY OF THE INVENTION

It is therefore an object of the present invention to provide a method and apparatus for detecting patterns of account usage that are typically associated with fraudulent schemes.

It is a further object of the present invention to provide a method and apparatus for identifying payment and merchant accounts that appear to be involved in fraudulent schemes.

To accomplish these and other objects, a method system in accordance with the present invention first identifies "new or newly active accounts" (NNAAs)—payment accounts which: (a) were opened recently and then were promptly used to conduct a substantial number of high-value transactions, or (b) have exhibited a substantial increase in high-value transaction activity. One or more suspect merchant accounts are then identified based upon patterns of high-value transaction activity between the merchant account and the NNAAs. A merchant account is selected as a suspect merchant account if: (a) at least a threshold number of NNAAs were used to conduct transactions with the merchant account during a particular time period; (b) at least a minimum fraction or percentage of the high-value transactions conducted with the merchant account was conducted using NNAAs; (c) at least a minimum fraction or percentage of the total monetary value of the high-value transactions conducted with the merchant account was from transactions conducted using NNAAS; (d) at least a minimum fraction or percentage of all transactions conducted with the merchant account was due to high-value transactions; (e) at least a minimum fraction or percentage of the total monetary value of all transactions conducted with the merchant account was due to high-value transactions; (f) the high-value transactions conducted with the merchant account using NNAAs had at least a minimum combined monetary value; (g) the total number of all transactions conducted with the merchant account did not exceed a maximum number; and (h) the combined value of all transactions conducted with the merchant account did not exceed a maximum combined monetary value.

BRIEF DESCRIPTION OF THE DRAWINGS

Further objects, features, and advantages of the present invention will become apparent from the following detailed description taken in conjunction with the accompanying figures showing illustrative embodiments of the present invention, in which.

Throughout the drawings, unless otherwise stated, the same reference numerals and characters are used to denote like features, elements, components, or portions of the illustrated embodiments.

DETAILED DESCRIPTION OF THE INVENTION

Financial transactions performed in executing bust-out schemes often have characteristic patterns which can be identified using data mining techniques in accordance with the present invention. For example, credit card accounts or other payment accounts being used in bust-out schemes are often NNAAs—accounts which are new or exhibit stepped-up activity—because the bust-out transactions are intended to exhaust the account's resources and then pay the account bill using a false instrument. Transactions made in prior billing cycles are typically intended to establish a seemingly normal usage and payment profile. These transactions are typically not as large as those conducted during the final spending spree.

In many cases, an account portfolio used for a cardholder bust-out exhibits distinctive patterns of transaction activity. For example, it is typical for a bust-out perpetrator to use more than one account in the portfolio at the same merchant. Such common usage patterns can be detected and used to identify suspect card portfolios as well as merchants at which common transactions have been made.

Figure 1:
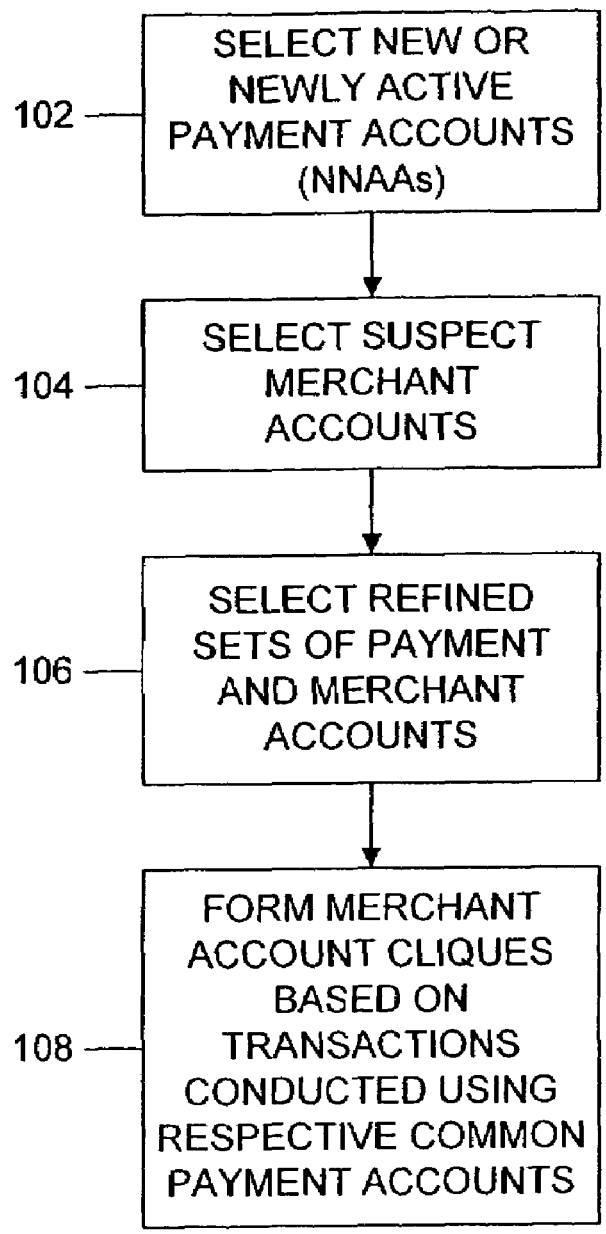
FIG. 1 is a flow diagram illustrating an exemplary procedure for detecting payment account fraud in accordance with the present invention.

FIG. 1 illustrates an exemplary procedure for identifying payment accounts and merchant accounts that appear to be exhibiting the above-described patterns, and are therefore likely candidates for further investigation to determine whether the accounts are involved in one or more bust-out schemes. The illustrated procedure typically uses a transaction database containing data which have been accumulated by a payment organization or by a financial institution such as an issuing bank. The accumulated data preferably includes account information identifying the payment account and merchant account involved in each transaction. In the illustrated procedure, accounts exhibiting certain characteristics—i.e., accounts which either: (a) have been recently opened and then promptly used to conduct a substantial number of high-value transactions, or (b) have exhibited a recent increase in transaction activity—are selected as NNAAs (step 102). Merchant accounts with which a certain number, value, or percentage of transactions have been conducted using one or more of the NNAAs are selected for further analysis (step 104). The list of NNAAs is further refined by selecting those NNAAs that have been used for conducting transactions with at least a minimum number of the suspect merchant accounts identified in step 104 (step 106). Typically, the refining step 106 selects only those NNAAs that have been used to conduct transactions with at least two of the suspect merchant accounts.

In addition, if a particular payment account or payment account portfolio has been used to conduct transactions with two or more merchant accounts, the group of merchant accounts can be considered "linked" by the payment account or payment account portfolio. Each group or subset of merchants thus linked by a common payment account or payment account portfolio can be identified (step 108). Such groups or subsets of linked merchants are also referred to herein as "cliques" of merchants If payment accounts with stepped-up activity are used for a large fraction of the payment account transactions conducted with these merchants, there is reason to suspect that a bust-out scheme is underway. In addition, bust-out merchants' accounts are often new, particularly if the intent is to conduct transactions using stolen or compromised account data.

On the other hand, certain types of merchants are often linked by legitimate, non-fraudulent transactions on payment accounts with stepped-up activity. Examples of such transactions include those involving medical expenses at multiple providers (e.g., hospitals, laboratories, and physicians), funeral and burial plot fees, and higher education costs (e.g., tuition and housing). Because such transactions are likely to be legitimate, they are preferably excluded from consideration when identifying the NNAAs in step 102 of the procedure illustrated in FIG. 1.

In addition, certain merchants are preferably excluded a priori from the search for merchant bust-outs. For example, major merchant chain brands associated with travel (e.g., hotel, airline and car rental companies) are unlikely to be involved in merchant bust-out schemes and are therefore preferably excluded from the set of suspect merchant accounts selected in step 104. Such merchants can be readily identified by their dedicated merchant category codes.

Figure 2:
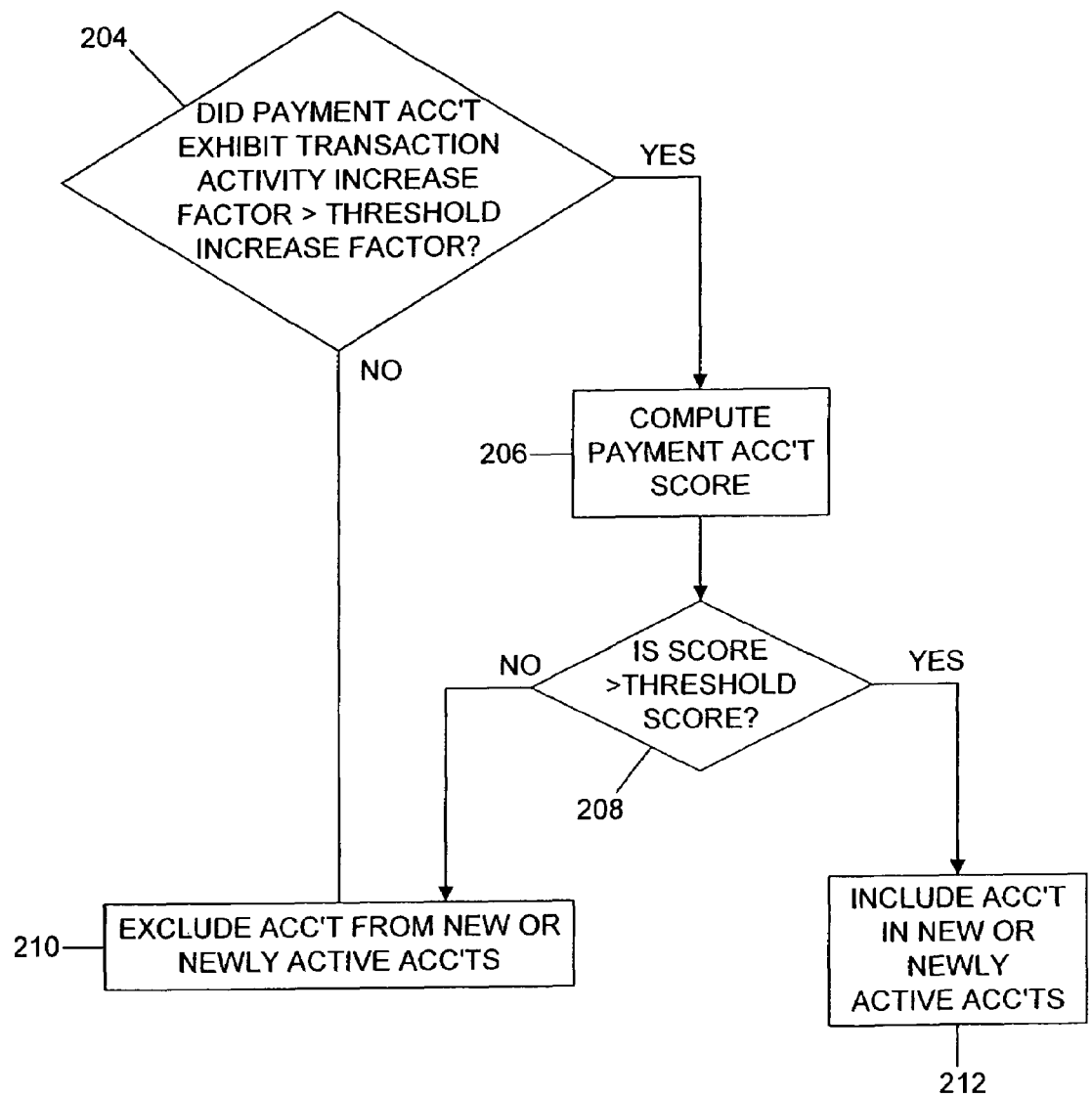
FIG. 2 is a flow diagram illustrating an exemplary procedure for identifying NNAAs in accordance with the present invention.
Figure 4:
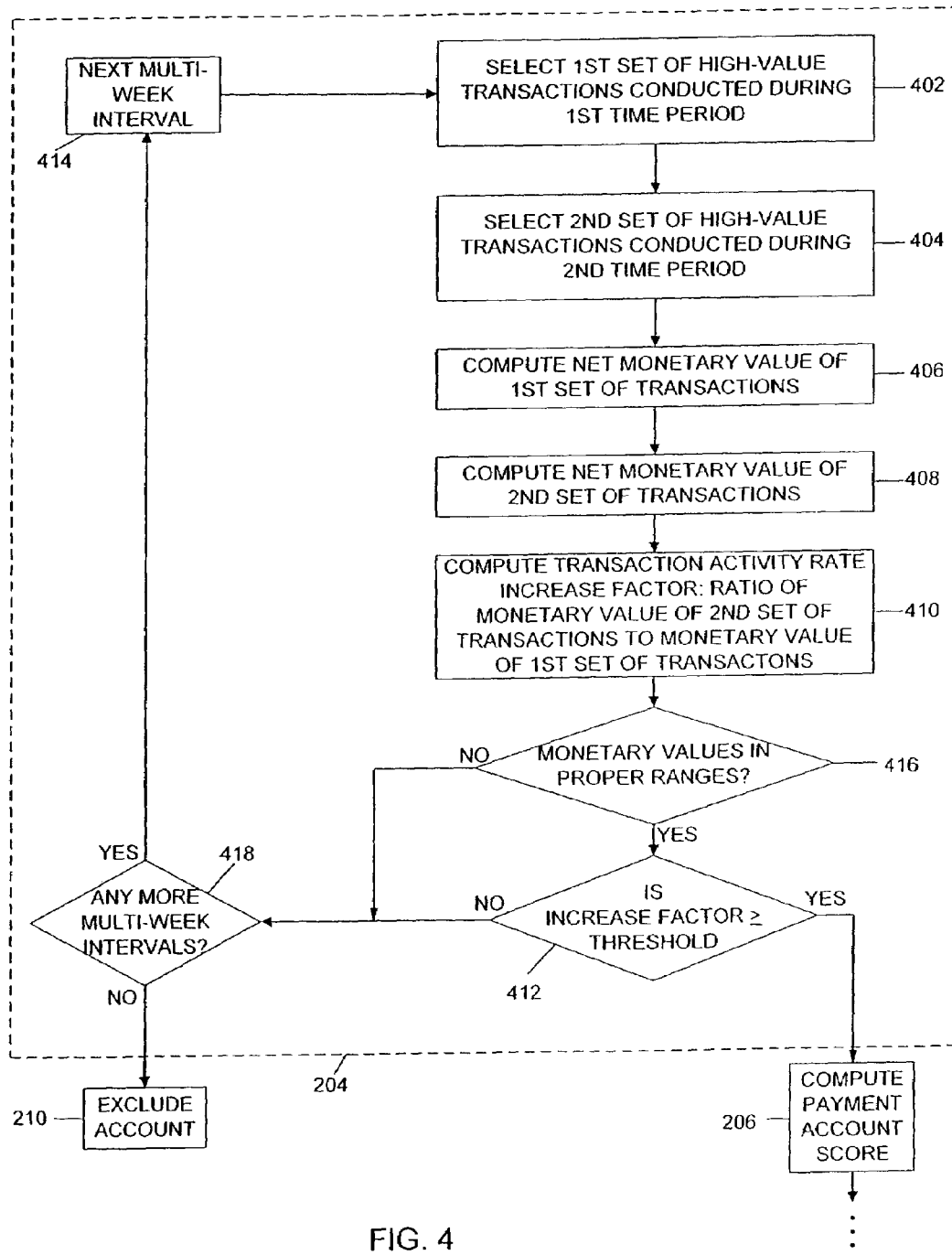
FIG. 4 is a flow diagram illustrating an exemplary procedure for identifying NNAAs in accordance with the present invention.
Figure 8:
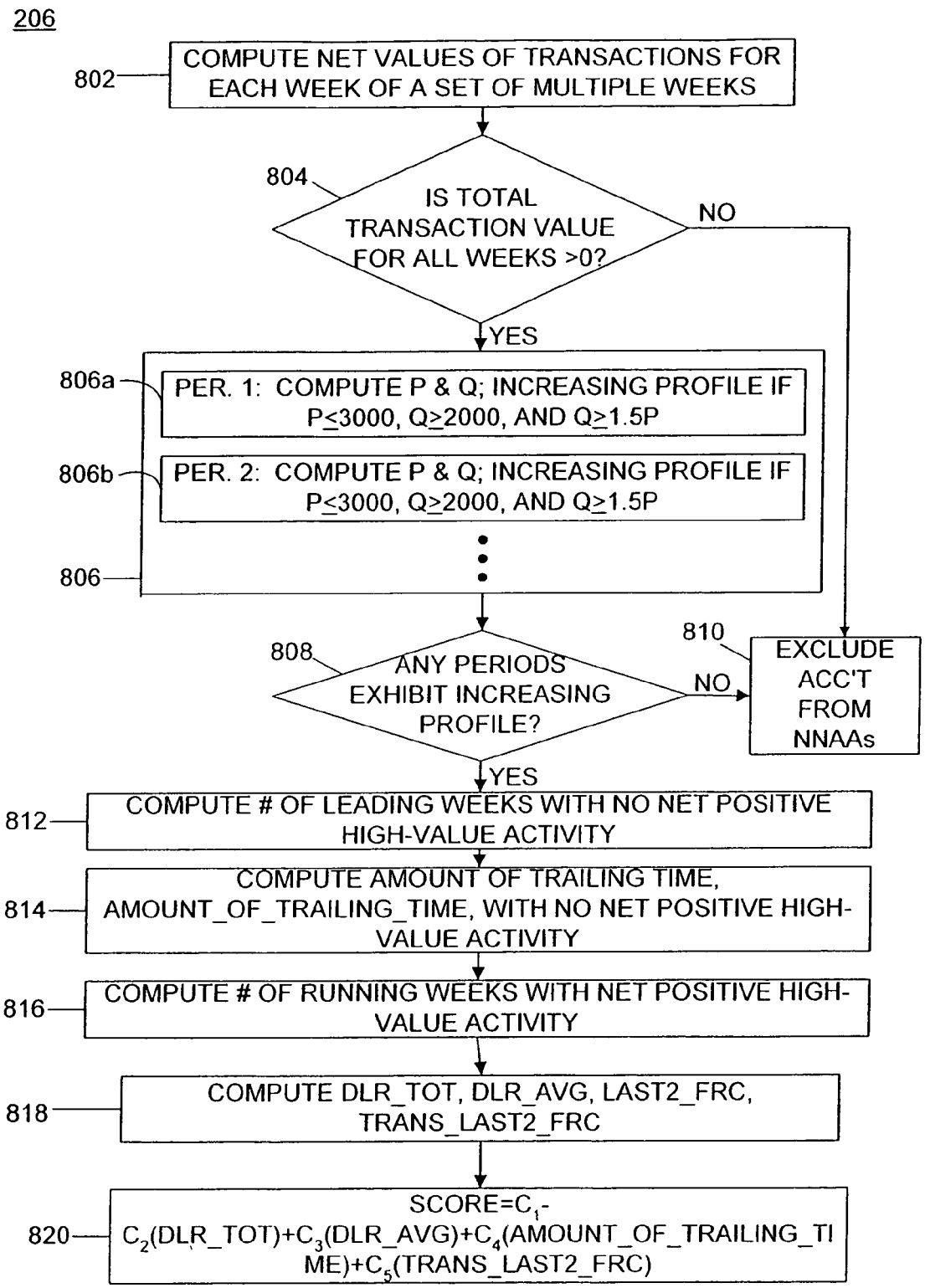
FIG. 8 is a flow diagram illustrating an exemplary procedure for identifying NNAAs in accordance with the present invention.

To select the NNAAs in step 102 of the procedure illustrated in FIG. 1, the procedure illustrated in FIG. 2 is used to evaluate each payment account in the transaction database. For each payment account, step 204—an example of which is illustrated in FIG. 4, discussed below—determines whether the payment account exhibited, during a particular time period, a transaction activity increase factor greater than a threshold increase factor. If not, the account is excluded from the set of NNAAs (step 210). If, in step 204, it is determined that the payment account exhibited a sufficiently large increase in transaction activity, the payment account is processed further by computing a payment account score (step 206) and then determining whether the score is greater than a threshold score (step 208). An exemplary procedure for computing a payment account score (step 206) is illustrated in FIG. 8, discussed in further detail below. If the payment account score is not greater than the threshold score (step 208), the account is excluded from the set of NNAAs (step 210). However, if the payment account score is greater than the threshold score (step 208), then the account is included in the set of NNAAs (step 212).

FIG. 4 illustrates an exemplary procedure for determining whether a payment account exhibited a substantial increase in transaction activity—preferably considering only high-value transactions (e.g., transactions of at least $270+). The illustrated procedure can be used as step 204 of the procedure illustrated in FIG. 2, discussed above. In the procedure 204 illustrated in FIG. 4, a first set of high-value (e.g., $270+) transactions is selected, based on transaction amount and date, from among those listed in the transaction database (step 402). Step 402 selects only transactions which were conducted during a first time period. A second set of high-value transactions is also selected, each transaction having been conducted during a second time period subsequent to the first time period (step 404). For example, a 16-week interval can be split into first and second 8-week time periods, and all transactions of at least $270 in these time periods can be selected in steps 402 and 404. In any case, the respective net monetary values of each of the first and second sets of transactions are computed (steps 406 and 408). In computing the net monetary values, a credit transaction—i.e., a credit to the account, as opposed to a retail sale or cash disbursement—is assigned a negative value. In step 410, a transaction activity rate increase factor is computed. The increase factor is the ratio of the monetary value of the second set of transactions to the monetary value of the first set of transactions. If the net monetary value of the first set of transactions is below a specified threshold (e.g. $3,000) and the net monetary value of the second set of transactions exceeds a specified threshold (e.g. $2,000) (step 416), and if the transaction activity rate increase factor is greater than or equal to a threshold increase factor (e.g., 1.5) (step 412), the payment account is subjected to further processing, as is discussed above with respect to FIG. 2 (step 206, etc.). Requiring the first set of transactions to have a net value below, e.g., $3,000 is advantageous because it eliminates from consideration payment accounts held by persons who are merely big spenders—such accounts often have significant fluctuations in transaction activity, but rarely are involved in bust-out schemes. Requiring the second set of transactions to have a net value above, e.g., $2,000 is advantageous because it eliminates from consideration payment accounts having less activity than would be expected in a bust-out scheme.

If the respective monetary values are not within their proper ranges (step 416) or the increase factor is less than the threshold increase factor (step 412), the algorithm continues to step 418, which determines whether any additional multi-week (e.g., 16-week) intervals remain to be considered. If there are no more intervals (step 418), the account is excluded from the set of NNAAs (step 210). However, if there are additional multi-week intervals to be considered (step 418), the algorithm moves on to the next multi-week interval (step 414) and repeats the procedure for that interval, starting with step 402.

FIG. 8 illustrates an exemplary payment account score computation procedure 206 for use in the payment account evaluation procedure illustrated in FIG. 2. For each payment account, the procedure 206 illustrated in FIG. 8 computes the respective net weekly dollar totals for each week of a set of successive weeks (e.g., a set of 27 weeks), based on all high-value transactions (e.g., transactions of at least $270) (step 802). Any amounts credited to the payment account are treated as having negative value. If the total value of the 27 weeks' transactions is not positive (step 804)—which can, for example, occur if credits to the account equal or exceed the total of debit and cash advance transactions—the account is excluded from the set of NNAAs (step 810). Otherwise (step 804), for each of twelve 16-week periods (period 1: weeks 1-16, period 2: weeks 2-17, period 3: weeks 3-18, . . . period 12: weeks 12-27) the algorithm determines whether there is an increasing usage profile (step 806). To determine whether a particular 16-week period exhibits an increasing usage profile the following procedure is used (steps 806*a*, 806*b*, etc. for the respective periods):

Compute P=total net transaction volume for weeks 1-8;
Compute Q=total net transaction volume for weeks 9-16;
The period is considered to exhibit an increasing profile if $P \leq 3000$, $Q \geq 2000$, and $Q \geq 1.5*P$.

If none of the 12 periods exhibits an increasing usage profile (step 808), the payment account is excluded from the set of NNAAs (step 810). Otherwise, for each payment account, the following numbers are computed:

Number of leading weeks with no net positive high-value transaction activity (step 812);
Number of trailing weeks (more generally, Amount_of_Trailing_Time) with no net positive high-value transaction activity (step 814); and
Number of running weeks with net positive high-value transaction activity (step 816).

For example, if a payment account has net positive high-value transaction activity in weeks 4-6 and week 20, there are 3 leading weeks (1-3), 7 trailing weeks (21-27), and 17 running weeks (4-20). As an additional example, if a payment account has net positive high-value transaction activity in weeks 1-22, there are 0 leading weeks, 5 trailing weeks (23-27), and 22 running weeks (1-22).

The following numbers are then computed (step 818):
Dlr_Tot: total net sales for 27 weeks ($270+transactions);
Dlr_Avg: average weekly sales during running weeks=Dlr_Tot/number of running weeks;
Last2_Frc: fraction of total net sales during last 2 running weeks (except that if there is only 1 running week, Last2_Frc=1.0); and
Trans_Last2_Frc=MAX(0.2, Last2_Frc).

The score for the payment account is computed as follows (in step 820):

$$\text{score} = C_1 - C_2(\text{Dlr\_Tot}) + C_3(\text{Dlr\_Avg}) + C_4(\text{Amount\_of\_Trailing\_Time}) + C_5(\text{Trans\_Last2}_{Frc}).$$

Preferably, the coefficients $C_1$, $C_2$, $C_3$, $C_4$, and $C_5$ have the values illustrated in the following equation:

$$\text{Score} = -0.00547 - 0.00000154*\text{Dlr\_Tot} + 0.00003760*\text{Dlr\_Avg} + 0.00213*(\text{Amount\_of\_Trailing\_Time}) + 0.03432*\text{Trans\_Last2\_Frc}.$$

Preferably, only accounts with a score of 0.01 or higher are included in the set of NNAAs (steps 208 and 212 illustrated in FIG. 2).

Figure 3:
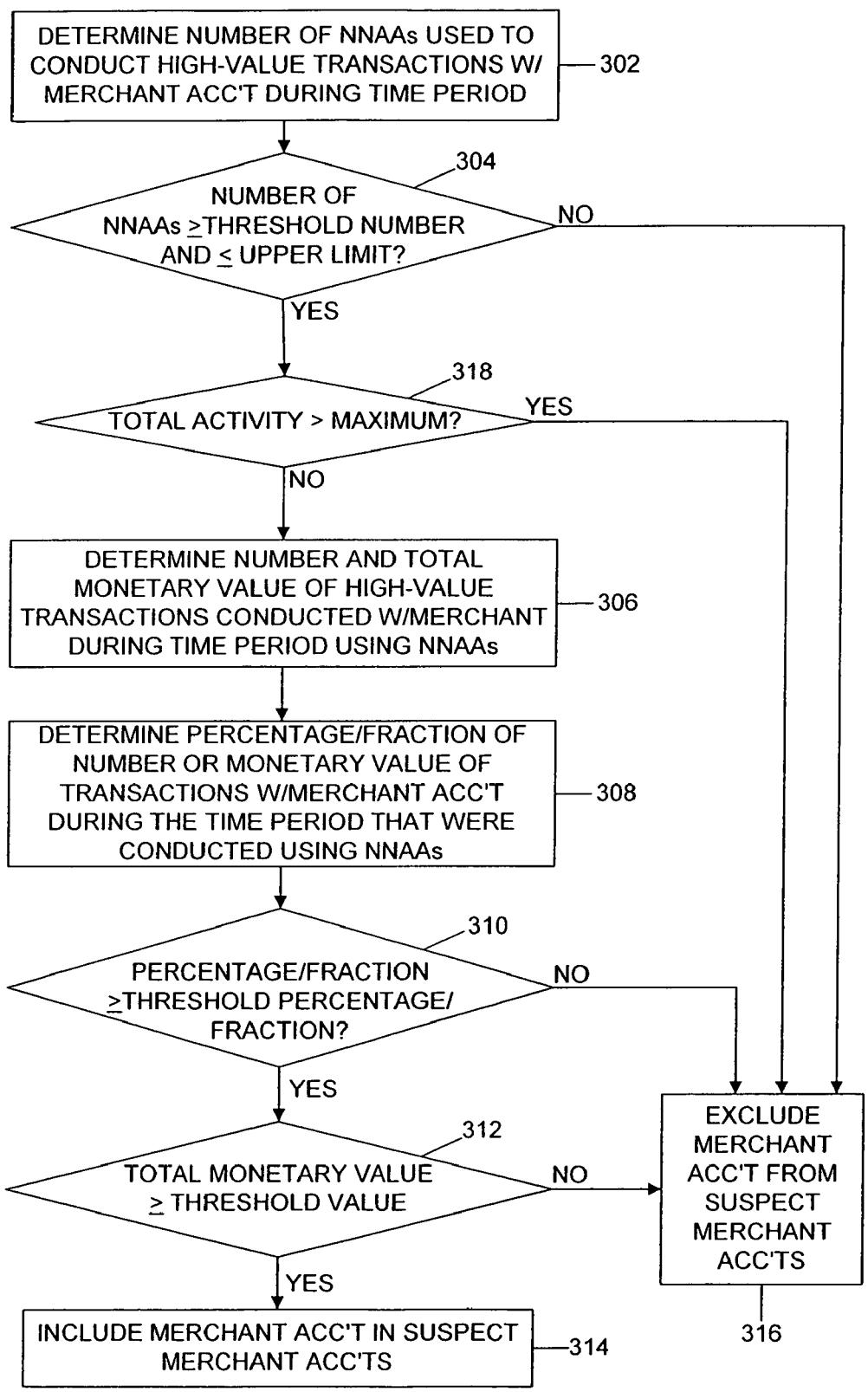
FIG. 3 is a flow diagram illustrating an exemplary procedure for identifying suspect merchant accounts in accordance with the present invention.

FIG. 3 illustrates an exemplary procedure for evaluating a merchant account to determine whether the account should be included in the set of suspect merchant accounts discussed above with respect to step 104 of the procedure illustrated in FIG. 1. Preferably, all transactions except high-value (e.g., $270+) transactions are excluded from consideration in this procedure. The procedure illustrated in FIG. 3 first determines the number of NNAAs used to conduct high-value transactions with the merchant during a particular time period (step 302). The specified time period can, for example, be the second time period, discussed above with respect to FIGS. 2 and 4, that was used for determining the transaction activity rate increases of the respective payment accounts. The time period can also be the entire 27-week interval (discussed above with respect to FIG. 8) examined to select and score each NNAA. The procedure illustrated in FIG. 3 determines whether the number of NNAAs used to conduct high-value transactions with the merchant is greater than or equal to a threshold number but no more than an upper limit (step 304). For example, if the threshold number is 2, the procedure selects only merchants with which at least two NNAAs were used to conduct high-value transactions during the specified time period. If the number of NNAAs used to conduct high-value transactions with the merchant account during the specified time period is less than the threshold number or exceeds the upper limit (step 304), the merchant is excluded from the set of suspect merchant accounts (step 316). Furthermore, if the total activity at the merchant (measured by any or all of the following: all transactions, high-value transactions, total net sales, net high-value transactions) exceeds specified thresholds (step 318), the merchant account is excluded from consideration as suspect (step 316). Otherwise, the procedure moves on to step 306 which determines the number and total monetary value of the high-value transactions conducted with the merchant using NNAAs during the specified time period. The procedure then determines what percentage or fraction of the number or monetary value of all of the transactions conducted with the merchant during the time period were also conducted using NNAAs (step 308). If the transactions conducted with the merchant using NNAAs represent less than a threshold percentage or fraction (e.g., 20%) of, optionally, either the number or monetary value all of the transactions conducted with the merchant during the specified time period (step 310), the merchant is excluded from the set of suspect merchant accounts (step 316). However, if the transactions conducted with the merchant using NNAAs represent at least the threshold percentage or fraction of all of the transactions conducted with the merchant during the specified time period (step 310), the procedure moves on to step 312. Step 312 determines whether the total monetary value of the transactions conducted with the merchant using the NNAAs during the specified time period is greater than or equal to a threshold monetary value (e.g., $5,000). If not (step 312), the merchant is excluded from the set of suspect merchant accounts (step 316). If, however, the total monetary value of the transactions conducted with the merchant using NNAAs is greater than or equal to the threshold value (step 312), the merchant is included in the set of suspect merchant accounts (step 314).

Iteration is used to refine the sets of merchant accounts and NNAAs, to yield refined sets of merchant accounts and NNAAs satisfying the following conditions:
  each merchant conducted transactions with at least 2 NNAAs during the second subinterval;
  each NNAA was used to conduct transactions with at least 2 of the merchants;
  the net high-value transaction monetary value of each NNAA exceeds a specified fraction or percentage of the total transactions with the 2 merchants;
  the net high-value transaction monetary value of each NNAA exceeds a specified fraction or percentage of high-value transactions with the 2 merchants; and
  the net high-value transaction monetary value exceeds a specified fraction or percentage of the transactions conducted with each merchant.

Figure 5:
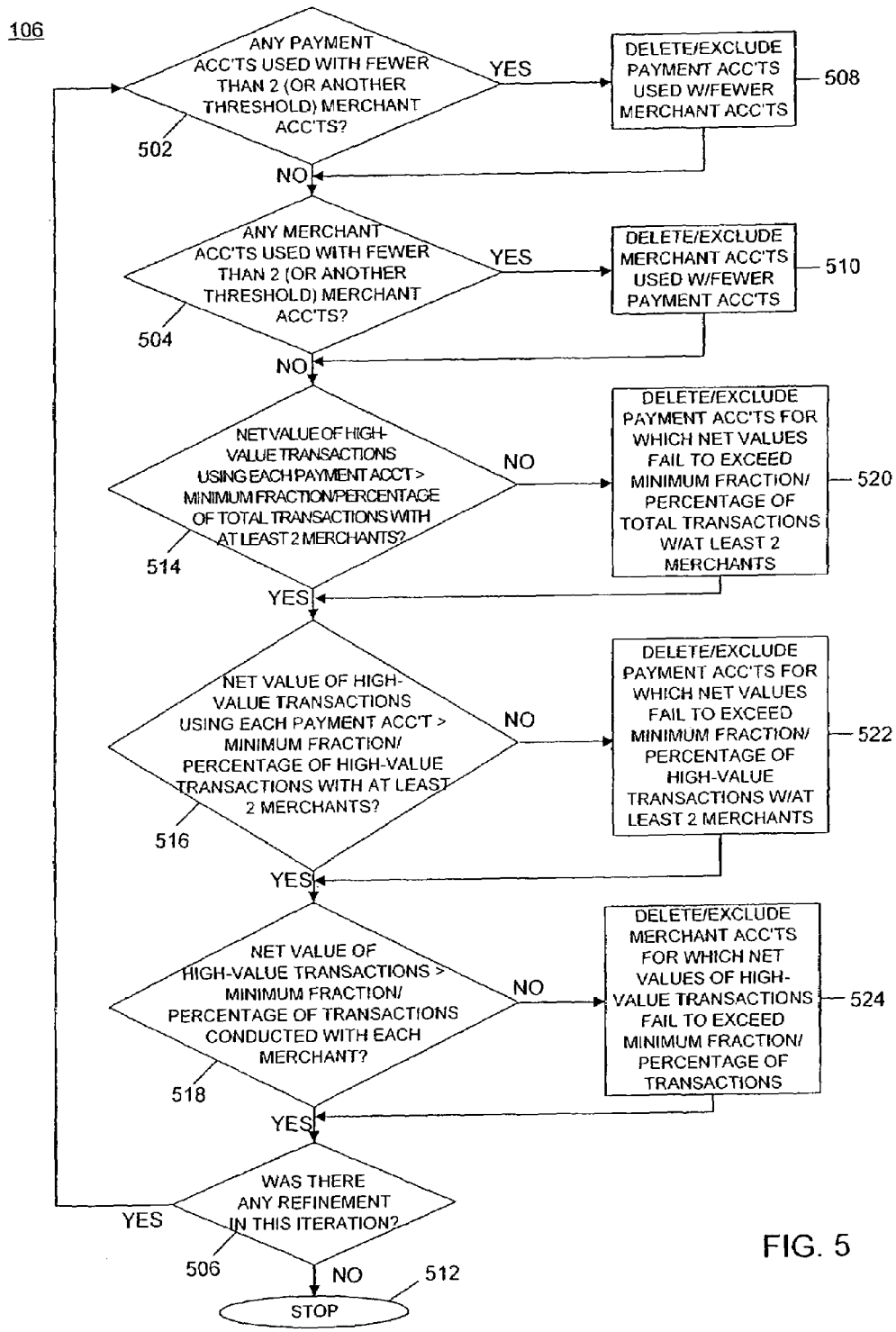
FIG. 5 is a flow diagram illustrating an exemplary procedure for refining sets of NNAAs and suspect merchant accounts in accordance with the present invention.

FIG. 5 illustrates a procedure for refining the respective sets of payment and merchant accounts in accordance with the present invention. The procedure illustrated in FIG. 5 can be used as step 106 of the procedure illustrated in FIG. 1. In the procedure illustrated in FIG. 5, if any payment accounts in the set of NNAAs were used with fewer than a threshold number (e.g., 2) of the suspect merchant accounts (step 502), these payment accounts are deleted/excluded from the refined set of payment accounts (step 508). If any merchant accounts in the set of suspect merchant accounts were used with fewer than a threshold number (e.g., 2) of the NNAAs (step 504), these merchant accounts are excluded from the refined set of suspect merchant accounts (step 510). The illustrated procedure will retain a payment account only if the net value of high-value transactions conducted using the account exceeds a minimum fraction/percentage of the total value of transactions conducted with at least two of the merchant accounts. If there are any payment accounts that do not satisfy this criterion (step 514), these payment accounts are deleted/excluded from the refined set of payment accounts (step 520). The procedure also will retain a payment account only if the net value of high-value transactions conducted using the payment account exceeds a minimum fraction/percentage of the value of high-value transactions conducted with at least two of the merchant accounts. If there are any payment accounts that do not satisfy this criterion (step 516), these payment accounts are deleted/excluded from the refined set of payment accounts (step 522). The procedure will retain the merchant account only if the net value of high-value transactions conducted with the merchant account exceeds a minimum fraction/percentage of the value of all of the transactions conducted with the merchant account. If there are any merchant accounts that do not satisfy this criterion (step 518), these merchant accounts are deleted/excluded from the refined set of suspect merchant accounts (step 524). If any refinement of the aforementioned sets of accounts has occurred in the most recent round of iteration (step 506), the procedure repeats starting with step 502. Otherwise, the refinement procedure is terminated (step 512). The result is a refined set of payment accounts and a refined set of merchant accounts.

As is discussed above with respect to the procedure illustrated in FIG. 1, the refined set of merchant accounts is preferably partitioned into one or more cliques of merchant accounts, each clique being associated with a payment account (preferably from the refined set of payment accounts discussed above with respect to FIG. 5) used to conduct transactions with two or more of the merchant accounts in the clique (step 108). The process of forming suspect merchant account cliques is preferably performed as follows:
  1. Select a suspect merchant account (from step 106, FIG. 1)
  2. Identify all NNAAs (from step 106, FIG. 1) used to conduct transactions with the selected merchant account(s).
  3. Identify all suspect merchant account(s) with which with these NNAAs were used to conduct transactions.

4. Repeat steps 2 and 3 until no additional NNAAs or merchant accounts are identified. The set of all merchant accounts so identified is the clique containing the originally selected suspect merchant account.
5. Select any suspect merchant account (from step 106, FIG. 1) not yet assigned to a clique. Repeat steps 1-4 to identify the clique to which this merchant account belongs.
6. Repeat step 5 until the set of suspect merchant accounts (from step 106, FIG. 1) is exhausted—that is, until all suspect merchants are assigned to cliques.

Without any additional processing, the above-described process of forming merchant account cliques may, in some cases, group certain legitimate transactions. For example, it is not unusual for an account with relatively low prior use to be used in a legitimate manner to pay for the following goods and services:

- large medical expenses such as hospitalization, physician(s) fees, and laboratory fees;
- death-related services such as charges for a funeral and burial plot; and/or
- education-related services such as tuition and housing.

It is typically preferable to exclude these merchant groups and their associated transactions from consideration in the search for cardholder bust-out schemes, particularly if the merchants or institutions involved are believed to legitimate. Similarly, when attempting to identify merchant bust-outs, it is appropriate to eliminate from consideration merchants which are branded travel chains. In addition, the following merchant account cliques are preferably excluded:

- cliques consisting of merchant accounts all of which have the same acquirer; and
- cliques consisting of 2 merchant accounts which seem to represent the same physical merchant which changed acquirers during the time period under review.

Figure 6:
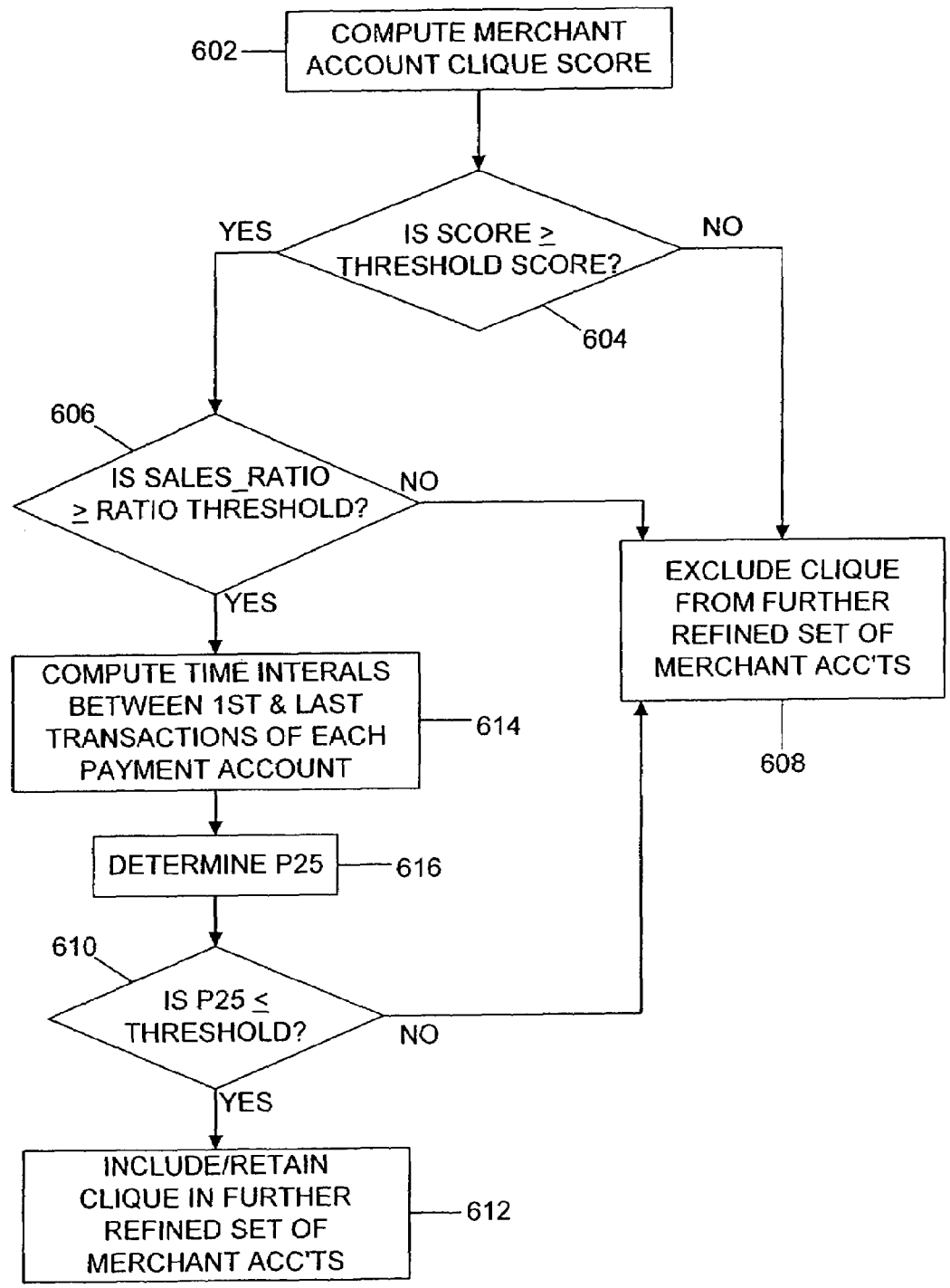
FIG. 6 is a flow diagram illustrating an exemplary procedure for further refining a set of suspect merchant accounts in accordance with the present invention.

Preferably, a scoring system in accordance with the present invention is used to further refine the set of merchant accounts, as is illustrated in FIG. 6. Such a scoring system takes into account certain characteristics commonly observed in merchant accounts being used to perpetrate bust-out schemes. Based upon these known patterns, a merchant account clique score is computed (step 602)—using, for example, the procedure illustrated in FIG. 7, which is discussed in further detail below. If the score is less than a threshold score such as 0.35 (step 604), the clique is excluded from the further refined set of merchant accounts (step 608). Otherwise, the procedure continues on to step 606, which considers the "sales ratio" of the account clique, the sales ratio being the ratio of the total value of all transactions conducted with the merchant accounts in the clique to the total value of all of the high-value transactions conducted during the time period under review with any merchant account—i.e., not only the merchant accounts in the clique—using the payment accounts linked to the clique. If the sales ratio is less than a ratio threshold such as 0.334 (step 606), the clique is excluded from the further refined set of merchant accounts (step 608). However, if the sales ratio is greater than or equal to the ratio threshold, the procedure continues with step 614. Step 614 considers each payment account used in a high-value transaction with any merchant in the clique, as well as all of the payment account's high-value transactions conducted during the 27-week period under review. For each of these payment accounts, the time interval (in days) between the first and last of these transactions is computed (step 614). P25 is defined, in step 616, as the 25th percentile value of the statistical distribution of these time intervals. In step 610, if P25 is less than or equal to a particular threshold such as 60 days, then the clique is included/retained in the further refined set of merchant accounts (step 612). Otherwise, the clique is excluded from the further refined set of merchant accounts (step 608).

Figure 7:
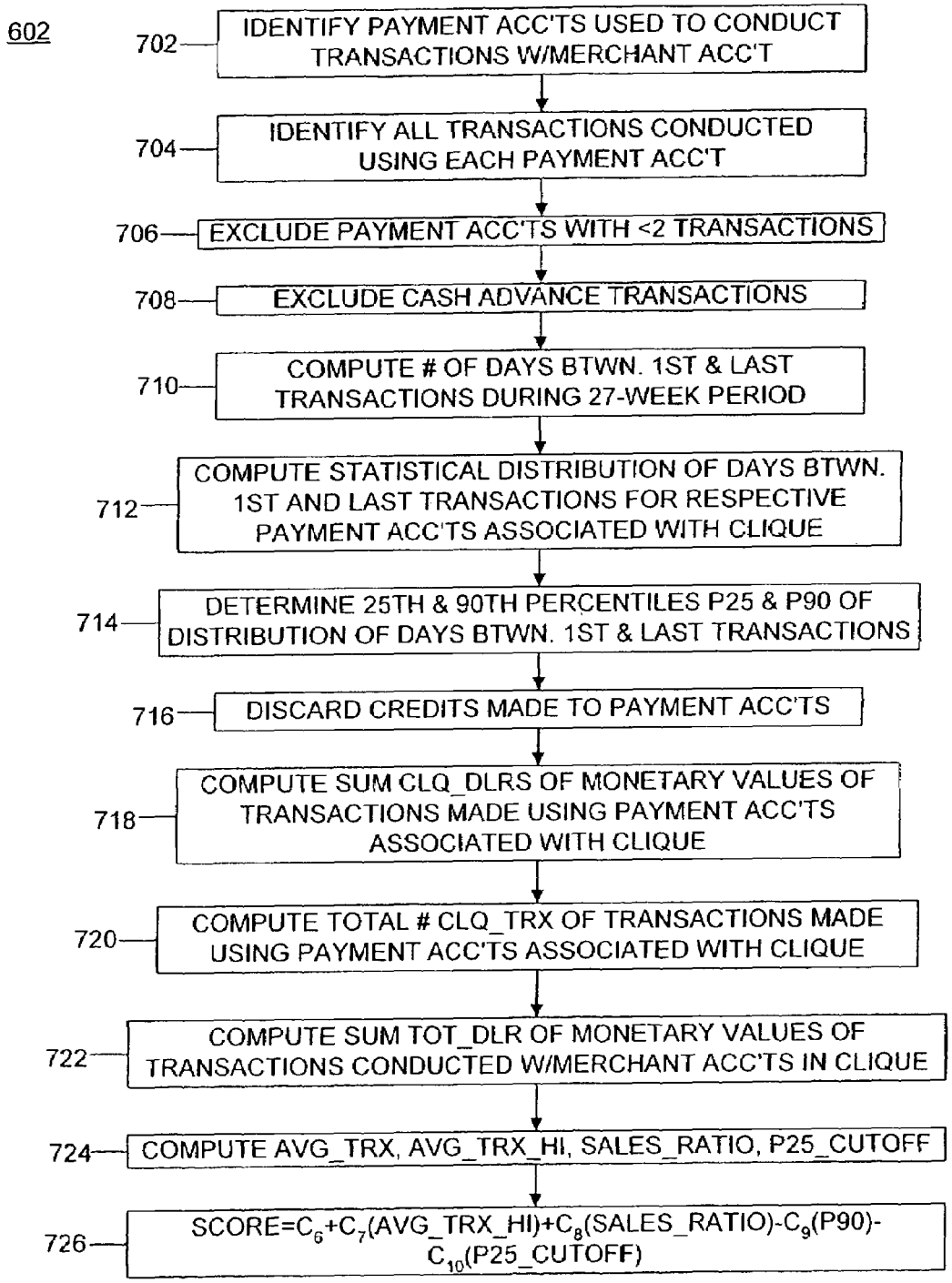
FIG. 7 is a flow diagram illustrating an additional exemplary procedure for further refining a set of suspect merchant accounts in accordance with the present invention.

FIG. 7 illustrates an exemplary procedure—suitable for use as step 602 illustrated in FIG. 6—for deriving a merchant account clique score. For each merchant account in a clique, the illustrated procedure 602 identifies all payment accounts used to conduct high-value transactions (e.g., transactions of at least $270) with the merchant account during the 27-week period under study (step 702). For each payment account selected in step 702, all high-value (e.g., $270+) transactions conducted with any merchant account during the 27-week period under study are identified (step 704). Payment accounts with fewer than two such transactions are excluded (step 706). Cash advance transactions are also excluded from the computation (step 708). For each remaining payment account, the procedure computes the number of days between the first and last non-cash transactions on the payment account during the 27-week period under study (step 710). For each merchant account clique, the procedure determines the statistical distribution—or at least the 25th and 90th percentiles, P25 and P90, respectively—of the number of days between first and last high-value (e.g. $270+) transactions on each payment account linked to the clique (steps 712 and 714). Credits made to the respective payment accounts are discarded from the data used to perform the subsequent computations (step 716). For each merchant account clique, the procedure computes the sum Clq_dlrs of the monetary values of the high-value transactions made by the payment accounts associated with the clique (step 718). The total number Clq_trx of transactions conducted using the payment accounts is also computed (step 720). For each merchant clique, the sum Tot_dlr of the monetary values of transactions conducted with the merchants in the clique is computed (step 722).

The following numbers are then computed for the clique (step 724):

- Avg_trx: average transaction on accounts linked to the clique=Clq_dlrs/Clq_trx;
- Avg_trx_hi: indicator variable for large average transactions=1 if Avg_trx $\leq$ 1800, 0 otherwise;
- Sales-Ratio: ratio of all dollar sales at merchant account in clique to all high-value sales ($270+) on payment accounts linked to the clique=Tot_dlr/Clq_dlrs; and
- P25_cutoff: derived from P25—the 25th percentile of the length of the time interval during which accounts linked to the clique have high-value ($270+) activity=min (40, P25).

The score for the clique is then computed (step 726): Score=$C_6$+$C_7$(Avg_trx_hi)+$C_8$(Sales_Ratio)−$C_9$ (P90)−$C_{10}$(P25_cutoff). For example, the coefficients illustrated in the following equation can be used:

$$\text{Score}=0.76418+0.18854*\text{Avg\_trx\_hi}+0.32298*\text{Sales\_Ratio}-0.00409*P90-0.00642*P25\_\text{cutoff}.$$

The result of applying the above-described procedures is a list of suspect transactions, payment accounts and merchant accounts. The payment account and merchant account information is preferably submitted to issuers and/or acquirers for further investigation. In addition, for each merchant account clique remaining in the further refined set of merchant accounts, a transaction summary report can be produced to facilitate investigations performed by the affected financial institutions.

It will be appreciated by those skilled in the art that the methods of FIGS. 1-8 can be implemented on various standard computer platforms operating under the control of suitable software defined by FIGS. 1-8. In some cases, dedicated computer hardware, such as a peripheral card in a conventional personal computer, can enhance the operational efficiency of the above methods.

Figure 9:
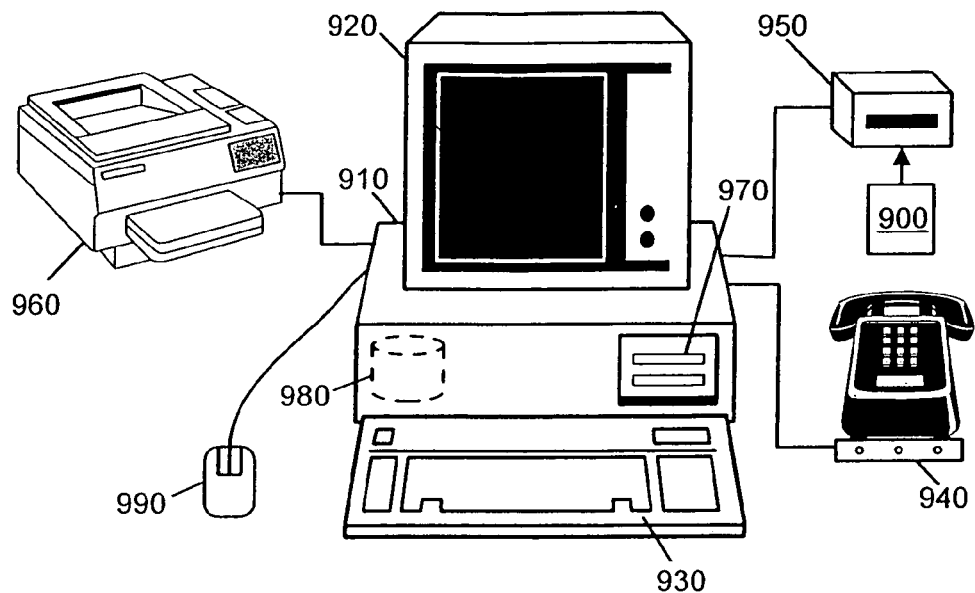
FIG. 9 is a diagram illustrating an exemplary computer system for performing the procedures illustrated in FIGS. 1-8.
Figure 10:
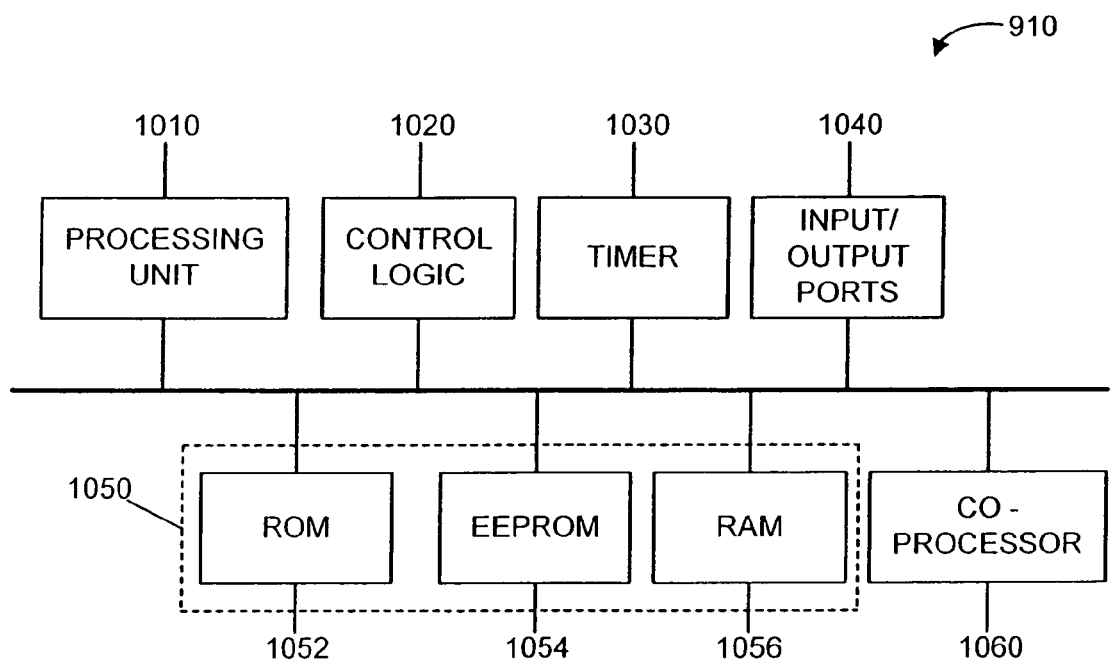
FIG. 10 is a block diagram illustrating an exemplary processing section for use in the computer system illustrated in FIG. 9.

FIGS. 9 and 10 illustrate typical computer hardware suitable for performing the methods of the present invention. Referring to FIG. 9, the computer system includes a processing section 910, a display 920, a keyboard 930, and a communications peripheral device 940 such as a modem. The system typically includes a digital pointer 990 such as a "mouse", and can also include other input devices such as a card reader 950 for reading an account card 900. In addition, the system can include a printer 960. The computer system typically includes a hard disk drive 980 and one or more additional disk drives 970 which can read and write to computer readable media such as magnetic media (e.g., diskettes or removable hard disks), or optical media (e.g., CD-ROMS or DVDs). The disk drives 970 and 980 are used for storing data and application software.

FIG. 10 is a functional block diagram which further illustrates the processing section 910. The processing section 910 generally includes a processing unit 1010, control logic 1020 and a memory unit 1050. Preferably, the processing section 910 also includes a timer 1030 and input/output ports 1040. The processing section 910 can also include a co-processor 1060, depending on the microprocessor used in the processing unit. Control logic 1020 provides, in conjunction with processing unit 1010, the control necessary to handle communications between memory unit 1050 and input/output ports 1040. Timer 1030 provides a timing reference signal for processing unit 1010 and control logic 1020. Co-processor 1060 provides an enhanced ability to perform complex computations in real time, such as those required by cryptographic algorithms.

Memory unit 1050 can include different types of memory, such as volatile and non-volatile memory and read-only and programmable memory. For example, as shown in FIG. 10, memory unit 1050 can include read-only memory (ROM) 1052, electrically erasable programmable read-only memory (EEPROM) 1054, and random-memory (RAM) 1056. Different computer processors, memory configurations, data structures and the like can be used to practice the present invention, and the invention is not limited to a specific platform.

Software defined by FIGS. 1-8 can be written in a wide variety of programming languages, as will be appreciated by those skilled in the art. Exemplary software algorithms in accordance with the present invention have been written in the SAS programming language. The computer source code for exemplary SAS algorithms is provided in the computer program listing appendix filed herewith.

Although the present invention has been described in connection with specific exemplary embodiments, it should be understood that various changes, substitutions, and alterations can be made to the disclosed embodiments without departing from the spirit and scope of the invention as set forth in the appended claims.

I claim:

1. A method for detecting payment account fraud, comprising computer implemented steps for:
   a. selecting one or more new or newly active payment accounts from a set of payment accounts, the step of selecting the one or more new or newly active payment accounts comprising, for each payment account of the set of payment accounts, excluding the payment account from the one or more new or newly active payment accounts if a transaction activity increase factor of the payment account, from a first time period to a second time period, was less than a threshold increase factor, the second time period being subsequent to the first time period; and
   b. selecting one or more suspect merchant accounts from a set of merchant accounts, the step of selecting the one or more suspect merchant accounts comprising at least one of the following steps for each merchant account of the set of merchant accounts:
      i. excluding the merchant account from the one or more suspect merchant accounts if a number of the one or more new or newly active payment accounts used to conduct at least one transaction with the merchant account during a third time period is less than a first threshold number or greater than an upper limit,
      ii. excluding the merchant account from the one or more suspect merchant accounts if a first fraction is less than a first threshold fraction, the first fraction comprising: (A) a number of transactions conducted with the merchant account during the third time period using at least one of the one or more new or newly active payment accounts, divided by (B) a total number of transactions conducted with the merchant account during the third time period,
      iii. excluding the merchant account from the one or more suspect merchant accounts if a second fraction is less than a second threshold fraction, the second fraction comprising: (C) a combined monetary value of the transactions conducted with the merchant account during the third time period using at least one of the one or more new or newly active payment accounts, divided by (D) a total combined monetary value of the transactions conducted with the merchant account during the third time period, and
      iv. excluding the merchant account from the one or more suspect merchant accounts if the transactions conducted with the merchant account during the third time period using at least one of the one or more new or newly active payment accounts have a combined monetary value that is less than a first threshold monetary value.

2. A method according to claim 1, wherein the including step comprises:
   selecting a first set of transactions conducted using the payment account, each transaction of the first set of transactions conducted using the payment account having a monetary value that is no greater than a second threshold monetary value, each transaction of the first set of transactions conducted using the payment account having been conducted during the first time period;
   selecting a second set of transactions conducted using the payment account, each transaction of the second set of transactions conducted using the payment account having a monetary value that is no less than a third threshold monetary value, each each transaction of the second set of transactions conducted using the payment account having been conducted during the second time period;
   computing a first monetary value associated with the payment account, the first monetary value associated with the payment account comprising a total monetary value of the first set of transactions conducted using the payment account;
   computing a second monetary value associated with the payment account, the second monetary value associated with the payment account comprising a total monetary value of the second set of transactions conducted using the payment account;

computing a ratio of: (E) the second monetary value associated with the payment account, to (F) the first monetary value associated with the payment account, for deriving the transaction activity increase factor of the payment account; and determining whether the transaction activity increase factor of the payment account is no less than the threshold increase factor.

3. A method according to claim 1, wherein the including step comprises computing the transaction activity increase factor based on high-value transactions conducted using the payment account, the high-value transactions being identified based on a minimum transaction value.

4. A method according to claim 1, wherein the step of selecting the one or more suspect merchant accounts comprises excluding from consideration all transactions except high-value transactions conducted with merchant accounts in the set of merchant accounts, the high-value transactions being identified based on a minimum transaction value.

5. A method according to claim 1, further comprising selecting: (a) a refined set of payment accounts from the one or more new or newly active payment accounts, and (b) a refined set of merchant accounts from the one or more suspect merchant accounts, each payment account in the refined set of payment accounts having been used for conducting transactions with no fewer than a threshold number of merchant accounts in the refined set of merchant accounts, the threshold number of merchant accounts in the refined set of merchant accounts being greater than or equal to two, each merchant account in the refined set of merchant accounts having been used for conducting transactions with no fewer than a threshold number of payment accounts in the refined set of payment accounts, the threshold number of payment accounts in the refined set of payment accounts being greater than or equal to two, the step of selecting the refined set of payment accounts and the refined set of merchant accounts comprising iteratively performing the following steps:

excluding from the refined set of payment accounts any payment accounts which have been used for conducting transactions with fewer than the threshold number of merchant accounts in the refined set of merchant accounts; and excluding from the refined set of merchant accounts any merchant accounts which have been used for conducting transactions with fewer than the threshold number of payment accounts in the refined set of payment accounts.

6. A method according to claim 5, further comprising forming one or more merchant account cliques, each clique of the one or more merchant account cliques comprising at least first and second merchant accounts of the refined set of merchant accounts, wherein one or more transactions have been conducted with the first merchant account of the clique using a particular account of the refined set of payment accounts, the particular account of the refined set of payment accounts being associated with the clique, wherein one or more transactions have been conducted with the second merchant account of the clique using the particular account of the refined set of payment accounts.

7. A method according to claim 6, further comprising the following steps for each clique of the one or more merchant account cliques:

computing a merchant account clique score of the clique, the merchant account clique score of the clique comprising $C_6+C_7(Avg\_trx\_hi)+C_8(Sales\_Ratio)-C_9(P90)-C_{10}(P25\_cutoff)$, wherein $C_6$, $C_7$, $C_8$, $C_9$, and $C_{10}$ are, respectively, sixth, seventh, eighth, ninth, and tenth coefficients, Avg_trx_hi comprising a non-zero value if and only if an average transaction value of the clique is greater than a second threshold monetary value, Sales_Ratio comprising a ratio of: (G) a total monetary value of transactions conducted with the clique, to (H) a monetary value of high-value transactions conducted with the clique, P90 comprising a 90th percentile statistical value of respective numbers of days between first and last high-value transactions conducted with the clique using respective payment accounts, P25_cutoff comprising a lesser of a cutoff value and P25, P25 comprising a 25th percentile statistical value of respective lengths of time intervals during which high-value transactions were conducted with the clique using the respective payment accounts; and excluding the clique from a further refined set of merchant accounts if the merchant account clique score is less than a threshold merchant account clique score.

8. A method according to claim 1, further comprising forming one or more merchant account cliques, each clique of the one or more merchant account cliques comprising at least first and second merchant accounts of the one or more suspect merchant accounts, wherein one or more transactions have been conducted with the first merchant account of the clique using a particular account of the one or more new or newly active payment accounts, the particular account of the one or more new or newly active payment accounts being associated with the clique, wherein one or more transactions have been conducted with the second merchant account of the clique using the particular account of the one or more new or newly active payment accounts.

9. A method according to claim 1, wherein the step of selecting one or more new or newly active payment accounts further comprises the following steps for each payment account of the set of payment accounts:

computing a payment account score of the payment account, the payment account score of the payment account comprising $C_1-C_2(Dlr\_Tot)+C_3(Dlr\_Avg)+C_4(Amount\_of\ Trailing\_Time)+C_5(Trans\_Last2\_Frc)$, wherein $C_1$, $C_2$, $C_3$, $C_4$, and $C_5$ are, respectively, first, second, third, fourth, and fifth coefficients, Dlr_Tot comprising a total monetary value of transactions having at least a minimum value per transaction and having been conducted using the payment account during a fourth time period, Dlr_Avg comprising an average monetary value of transactions conducted using the payment account during a fifth time period, Amount_of Trailing_Time comprising a length of a sixth time period, wherein a net value of transactions having at least the minimum value per transaction and having been conducted during the sixth time period using the payment account is no greater than zero, Trans_Last2_Frc comprising the greater of a minimum fraction and a ratio of: (E) a net monetary value of transactions conducted using the payment account during a most recent time period, to (F) a net monetary value of transactions conducted using the payment account during a longer time period comprising both the most recent time period and a time period preceding the most recent time period; and including the payment account in the one or more new or newly active payment accounts if the payment account score of the payment account is greater than a threshold payment account score.

10. A system for detecting payment account fraud, comprising a processing section configured to perform the steps of:

a. selecting one or more new or newly active payment accounts from a set of payment accounts, the step of selecting the one or more new or newly active payment accounts comprising, for each payment account of the set of payment accounts, excluding the payment account from the one or more new or newly active payment accounts if a transaction activity increase factor of the payment account, from a first time period to a second time period, was less than a threshold increase factor, the second time period being subsequent to the first time period; and b. selecting one or more suspect merchant accounts from a set of merchant accounts, the step of selecting the one or more suspect merchant accounts comprising at least one of the following steps for each merchant account of the set of merchant accounts:

i. excluding the merchant account from the one or more suspect merchant accounts if a number of the one or more new or newly active payment accounts used to conduct at least one transaction with the merchant account during a third time period is less than a first threshold number or greater than an upper limit, ii. excluding the merchant account from the one or more suspect merchant accounts if a first fraction is less than a first threshold fraction, the first fraction comprising: (A) a number of transactions conducted with the merchant account during the third time period using at least one of the one or more new or newly active payment accounts, divided by (B) a total number of transactions conducted with the merchant account during the third time period, iii. excluding the merchant account from the one or more suspect merchant accounts if a second fraction is less than a second threshold fraction, the second fraction comprising: (C) a combined monetary value of the transactions conducted with the merchant account during the third time period using at least one of the one or more new or newly active payment accounts, divided by (D) a total combined monetary value of the transactions conducted with the merchant account during the third time period, and iv. excluding the merchant account from the one or more suspect merchant accounts if the transactions conducted with the merchant account during the third time period using at least one of the one or more new or newly active payment accounts have a combined monetary value that is less than a first threshold monetary value.

11. A system according to claim 10, wherein the including step comprises:

selecting a first set of transactions conducted using the payment account, each transaction of the first set of transactions conducted using the payment account having a monetary value that is no greater than a second threshold monetary value, each transaction of the first set of transactions conducted using the payment account having been conducted during the first time period;

selecting a second set of transactions conducted using the payment account, each transaction of the second set of transactions conducted using the payment account having a monetary value that is no less than a third threshold monetary value, each transaction of the second set of transactions conducted using the payment account having been conducted during the second time period;

computing a first monetary value associated with the payment account, the first monetary value associated with the payment account comprising a total monetary value of the first set of transactions conducted using the payment account;

computing a second monetary value associated with the payment account, the second monetary value associated with the payment account comprising a total monetary value of the second set of transactions conducted using the payment account;

computing a ratio of: (E) the second monetary value associated with the payment account, to (F) the first monetary value associated with the payment account, for deriving the transaction activity increase factor of the payment account; and determining whether the transaction activity increase factor of the payment account is no less than the threshold increase factor.

12. A system according to claim 10, wherein the including step comprises computing the transaction activity increase factor based on high-value transactions conducted using the payment account, the high-value transactions being identified based on a minimum transaction value.

13. A system according to claim 10, wherein the step of selecting the one or more suspect merchant accounts comprises excluding from consideration all transactions except high-value transactions conducted with merchant accounts in the set of merchant accounts, the high-value transactions being identified based on a minimum transaction value.

14. A system according to claim 10, wherein the processing arrangement is further configured to perform the step of selecting: (a) a refined set of payment accounts from the one or more new or newly active payment accounts, and (b) a refined set of merchant accounts from the one or more suspect merchant accounts, each payment account in the refined set of payment accounts having been used for conducting transactions with no fewer than a threshold number of merchant accounts in the refined set of merchant accounts, the threshold number of merchant accounts in the refined set of merchant accounts being greater than or equal to two, each merchant account in the refined set of merchant accounts having been used for conducting transactions with no fewer than a threshold number of payment accounts in the refined set of payment accounts, the threshold number of payment accounts in the refined set of payment accounts being greater than or equal to two, the step of selecting the refined set of payment accounts and the refined set of merchant accounts comprising iteratively performing the following steps:

excluding from the refined set of payment accounts any payment accounts which have been used for conducting transactions with fewer than the threshold number of merchant accounts in the refined set of merchant accounts; and excluding from the refined set of merchant accounts any merchant accounts which have been used for conducting transactions with fewer than the threshold number of payment accounts in the refined set of payment accounts.

15. A system according to claim 14, wherein the processing arrangement is further configured to perform the step of forming one or more merchant account cliques, each clique of the one or more merchant account cliques comprising at least first and second merchant accounts of the refined set of merchant accounts, wherein one or more transactions have been conducted with the first merchant account of the clique using a particular account of the refined set of payment accounts, the particular account of the refined set of payment accounts being associated with the clique, wherein one or more transactions have been conducted with the second merchant account of the clique using the particular account of the refined set of payment accounts.

16. A system according to claim 15, wherein the processing arrangement is further configured to perform the following steps for each clique of the one or more merchant account cliques:

computing a merchant account clique score of the clique, the merchant account clique score of the clique comprising $C_6+C_7(\text{Avg\_trx\_hi})+C_8(\text{Sales\_Ratio})-C_9(\text{P90})-C_{10}(\text{P25\_cutoff})$, wherein $C_6$, $C_7$, $C_8$, $C_9$, and $C_{10}$ are, respectively, sixth, seventh, eighth, ninth, and tenth coefficients, Avg_trx_hi comprising a non-zero value if and only if an average transaction value of the clique is greater than a second threshold monetary value, Sales_Ratio comprising a ratio of: (G) a total monetary value of transactions conducted with the clique, to (H) a monetary value of high-value transactions conducted with the clique, P90 comprising a 90th percentile statistical value of respective numbers of days between first and last high-value transactions conducted with the clique using respective payment accounts, P25_cutoff comprising a lesser of a cutoff value and P25, P25 comprising a 25th percentile statistical value of respective lengths of time intervals during which high-value transactions were conducted with the clique using the respective payment accounts; and excluding the clique from a further refined set of merchant accounts if the merchant account clique score is less than a threshold merchant account clique score.

17. A system according to claim 10, wherein the processing arrangement is further configured to perform the step of forming one or more merchant account cliques, each clique of the one or more merchant account cliques comprising at least first and second merchant accounts of the one or more suspect merchant accounts, wherein one or more transactions have been conducted with the first merchant account of the clique using a particular account of the one or more new or newly active payment accounts, the particular account of the one or more new or newly active payment accounts being associated with the clique, wherein one or more transactions have been conducted with the second merchant account of the clique using the particular account of the one or more new or newly active payment accounts.

18. A system according to claim 10, wherein the step of selecting one or more new or newly active payment accounts further comprises the following steps for each payment account of the set of payment accounts:

computing a payment account score of the payment account, the payment account score of the payment account comprising $C_1-C_2(\text{Dlr\_Tot})+C_3(\text{Dlr\_Avg})+C_4(\text{Amount\_of Trailing\_Time})+C_5(\text{Trans\_Last2\_Frc})$, wherein $C_1$, $C_2$, $C_3$, $C_4$, and $C_5$ are, respectively, first, second, third, fourth, and fifth coefficients, Dlr_Tot comprising a total monetary value of transactions having at least a minimum value per transaction and having been conducted using the payment account during a fourth time period, Dlr_Avg comprising an average monetary value of transactions conducted using the payment account during a fifth time period, Amount_of Trailing_Time comprising a length of a sixth time period, wherein a net value of transactions having at least the minimum value per transaction and having been conducted during the sixth time period using the payment account is no greater than zero, Trans_Last2_Frc comprising the greater of a minimum fraction and a ratio of: (E) a net monetary value of transactions conducted using the payment account during a most recent time period, to (F) a net monetary value of transactions conducted using the payment account during a longer time period comprising both the most recent time period and a time period preceding the most recent time period; and including the payment account in the one or more new or newly active payment accounts if the payment account score of the payment account is greater than a threshold payment account score.

19. A computer-readable medium for detecting payment account fraud, the computer-readable medium having a set of instructions operable to direct a processor to perform the steps of:

a. selecting one or more new or newly active payment accounts from a set of payment accounts, the step of selecting the one or more new or newly active payment accounts comprising, for each payment account of the set of payment accounts, excluding the payment account from the one or more new or newly active payment accounts if a transaction activity increase factor of the payment account, from a first time period to a second time period, was less than a threshold increase factor, the second time period being subsequent to the first time period; and b. selecting one or more suspect merchant accounts from a set of merchant accounts, the step of selecting the one or more suspect merchant accounts comprising at least one of the following steps for each merchant account of the set of merchant accounts:

i. excluding the merchant account from the one or more suspect merchant accounts if a number of the one or more new or newly active payment accounts used to conduct at least one transaction with the merchant account during a third time period is less than a first threshold number or greater than an upper limit, ii. excluding the merchant account from the one or more suspect merchant accounts if a first fraction is less than a first threshold fraction, the first fraction comprising: (A) a number of transactions conducted with the merchant account during the third time period using at least one of the one or more new or newly active payment accounts, divided by (B) a total number of transactions conducted with the merchant account during the third time period, iii. excluding the merchant account from the one or more suspect merchant accounts if a second fraction is less than a second threshold fraction, the second fraction comprising: (C) a combined monetary value of the transactions conducted with the merchant account during the third time period using at least one of the one or more new or newly active payment accounts, divided by (D) a total combined monetary value of the transactions conducted with the merchant account during the third time period, and iv. excluding the merchant account from the one or more suspect merchant accounts if the transactions conducted with the merchant account during the third time period using at least one of the one or more new or newly active payment accounts have a combined monetary value that is less than a first threshold monetary value.

20. A computer-readable medium according to claim 19, wherein the including step comprises:

selecting a first set of transactions conducted using the payment account, each transaction of the first set of transactions conducted using the payment account having a monetary value that is no greater than a second threshold monetary value, each transaction of the first set of transactions conducted using the payment account having been conducted during the first time period;

selecting a second set of transactions conducted using the payment account, each transaction of the second set of transactions conducted using the payment account having a monetary value that is no less than a third threshold monetary value, each transaction of the second set of transactions conducted using the payment account having been conducted during the second time period;

computing a first monetary value associated with the payment account, the first monetary value associated with the payment account comprising a total monetary value of the first set of transactions conducted using the payment account;

computing a second monetary value associated with the payment account, the second monetary value associated with the payment account comprising a total monetary value of the second set of transactions conducted using the payment account;

computing a ratio of: (E) the second monetary value associated with the payment account, to (F) the first monetary value associated with the payment account, for deriving the transaction activity increase factor of the payment account; and determining whether the transaction activity increase factor of the payment account is no less than the threshold increase factor.

21. A computer-readable medium according to claim 19, wherein the including step comprises computing the transaction activity increase factor based on high-value transactions conducted using the payment account, the high-value transactions being identified based on a minimum transaction value.

22. A computer-readable medium according to claim 19, wherein the step of selecting the one or more suspect merchant accounts comprises excluding from consideration all transactions except high-value transactions conducted with merchant accounts in the set of merchant accounts, the high-value transactions being identified based on a minimum transaction value.

23. A computer-readable medium according to claim 19, wherein the set of instructions is further operable to direct the processor to perform the step of selecting: (a) a refined set of payment accounts from the one or more new or newly active payment accounts, and (b) a refined set of merchant accounts from the one or more suspect merchant accounts, each payment account in the refined set of payment accounts having been used for conducting transactions with no fewer than a threshold number of merchant accounts in the refined set of merchant accounts, the threshold number of merchant accounts in the refined set of merchant accounts being greater than or equal to two, each merchant account in the refined set of merchant accounts having been used for conducting transactions with no fewer than a threshold number of payment accounts in the refined set of payment accounts, the threshold number of payment accounts in the refined set of payment accounts being greater than or equal to two, the step of selecting the refined set of payment accounts and the refined set of merchant accounts comprising iteratively performing the following steps:

excluding from the refined set of payment accounts any payment accounts which have been used for conducting transactions with fewer than the threshold number of merchant accounts in the refined set of merchant accounts; and excluding from the refined set of merchant accounts any merchant accounts which have been used for conducting transactions with fewer than the threshold number of payment accounts in the refined set of payment accounts.

24. A computer-readable medium according to claim 23, wherein the set of instructions is further operable to direct the processor to perform the step of forming one or more merchant account cliques, each clique of the one or more merchant account cliques comprising at least first and second merchant accounts of the refined set of merchant accounts, wherein one or more transactions have been conducted with the first merchant account of the clique using a particular account of the refined set of payment accounts, the particular account of the refined set of payment accounts being associated with the clique, wherein one or more transactions have been conducted with the second merchant account of the clique using the particular account of the refined set of payment accounts.

25. A computer-readable medium according to claim 24, wherein the set of instructions is further operable to direct the processor to perform the following steps for each clique of the one or more merchant account cliques:

computing a merchant account clique score of the clique, the merchant account clique score of the clique comprising $C_6+C_7(Avg\_trx\_hi)+C_8(Sales\_Ratio)-C_9(P90)-C_{10}(P25\_cutoff)$, wherein $C_6$, $C_7$, $C_8$, $C_9$, and $C_{10}$ are, respectively, sixth, seventh, eighth, ninth, and tenth coefficients, Avg_trx_hi comprising a non-zero value if and only if an average transaction value of the clique is greater than a second threshold monetary value, Sales_Ratio comprising a ratio of: (G) a total monetary value of transactions conducted with the clique, to (H) a monetary value of high-value transactions conducted with the clique, P90 comprising a 90th percentile statistical value of respective numbers of days between first and last high-value transactions conducted with the clique using respective payment accounts, P25_cutoff comprising a lesser of a cutoff value and P25, P25 comprising a 25th percentile statistical value of respective lengths of time intervals during which high-value transactions were conducted with the clique using the respective payment accounts; and excluding the clique from a further refined set of merchant accounts if the merchant account clique score is less than a threshold merchant account clique score.

26. A computer-readable medium according to claim 19, wherein the set of instructions is further operable to direct the processor to perform the step of forming one or more merchant account cliques, each clique of the one or more merchant account cliques comprising at least first and second merchant accounts of the one or more suspect merchant accounts, wherein one or more transactions have been conducted with the first merchant account of the clique using a particular account of the one or more new or newly active payment accounts, the particular account of the one or more new or newly active payment accounts being associated with the clique, wherein one or more transactions have been conducted with the second merchant account of the clique using the particular account of the one or more new or newly active payment accounts.

27. A computer-readable medium according to claim 19, wherein the step of selecting one or more new or newly active payment accounts further comprises the following steps for each payment account of the set of payment accounts:

computing a payment account score of the payment account, the payment account score of the payment account comprising $C_1-C_2(Dlr\_Tot)+C_3(Dlr\_Avg)+C_4(Amount\_of\_Trailing\_Time)+C_5(Trans\_Last2\_Frc)$, wherein $C_1$, $C_2$, $C_3$, $C_4$, and $C_5$ are, respectively, first, second, third, fourth, and fifth coefficients, Dlr_Tot comprising a total monetary value of transactions having at least a minimum value per transaction and having been conducted using the payment account during a fourth time period, Dlr_Avg comprising an average monetary value of transactions conducted using the payment account during a fifth time period, Amount_of Trailing_Time comprising a length of a sixth time period, wherein a net value of transactions having at least the minimum value per transaction and having been conducted during the sixth time period using the payment account is no greater than zero, Trans_Last2_Frc comprising the greater of a minimum fraction and a ratio of: (E) a net monetary value of transactions conducted using the payment account during a most recent time period, to (F) a net monetary value of transactions conducted using the payment account during a longer time period comprising both the most recent time period and a time period preceding the most recent time period; and including the payment account in the one or more new or newly active payment accounts if the payment account score of the payment account is greater than a threshold payment account score.

\* \* \* \* \*